(12) United States Patent
Karaoguz et al.

(10) Patent No.: US 9,357,256 B2
(45) Date of Patent: May 31, 2016

(54) THIRD PARTY MEDIA CHANNEL ACCESS IN A MEDIA EXCHANGE NETWORK

(75) Inventors: Jeyhan Karaoguz, Irvine, CA (US); James Bennett, Laguna Beach, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2307 days.

(21) Appl. No.: 10/675,385

(22) Filed: Sep. 30, 2003

(65) Prior Publication Data

US 2004/0117813 A1    Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional (Continued)

(51) Int. Cl.
*H04N 7/173* (2011.01)
*H04N 21/436* (2011.01)
(Continued)

(52) U.S. Cl.
CPC ..... *H04N 21/43615* (2013.01); *H04N 21/2743* (2013.01); *H04N 21/2747* (2013.01);
(Continued)

(58) Field of Classification Search
CPC ... H04N 21/84; H04N 21/80; H04N 21/8133; H04N 21/632; H04N 21/6125; H04N 21/482; H04N 21/4788; H04N 21/4622; H04N 21/458; H04N 21/436; H04N 21/2747; H04N 21/2743
USPC ......... 725/86, 87, 39, 47, 48, 50, 52, 56, 109, 725/1–8; 726/12; 709/206, 238, 239
See application file for complete search history.

(56) References Cited

U.S. PATENT DOCUMENTS

| 5,721,815 | A | 2/1998 | Ottesen et al. |
| 5,721,878 | A | 2/1998 | Ottesen et al. |

(Continued)

FOREIGN PATENT DOCUMENTS

| WO | WO 00/13415 | * | 3/2000 | ............... H04N 7/14 |
| WO | 01/19084 | | 3/2001 | |

(Continued)

OTHER PUBLICATIONS

European Search Report dated Aug. 10, 2004 for European Patent Application No. 03024386.9.

(Continued)

*Primary Examiner* — Hunter B Lonsberry
*Assistant Examiner* — Patrick A Ryan
(74) *Attorney, Agent, or Firm* — Garlick & Markison; Bruce E. Garlick

(57) ABSTRACT

Certain aspects of the invention may be found in a method and system for providing media in a communication network and may comprise generating a request from a first location to receive media from a non-broadcast channel provider. Payment and/or authorization information may be provided to the non-broadcast channel provider and the media transferred from a storage location other than the non-broadcast channel provider to the first location. A representation of the received media may be presented in a media guide and/or a channel guide at the first location and the received media may be consumed at the first location. The method may further comprise the step of requesting that the received media be transferred from the storage location to a second location. An identifier of the second location may be transferred to the non-broadcast channel provider so that media may be transferred to the second location.

26 Claims, 14 Drawing Sheets

Related U.S. Application Data application No. 61/473,696, filed on May 28, 2003, provisional application No. 60/465,982, filed on Apr. 28, 2003, provisional application No. 60/448,658, filed on Feb. 18, 2003.

(51) Int. Cl.

| | | |
|---|---|---|
| *H04N 21/84* | (2011.01) | |
| *H04N 21/80* | (2011.01) | |
| *H04N 21/81* | (2011.01) | |
| *H04N 21/63* | (2011.01) | |
| *H04N 21/61* | (2011.01) | |
| *H04N 21/482* | (2011.01) | |
| *H04N 21/4788* | (2011.01) | |
| *H04N 21/458* | (2011.01) | |
| *H04N 21/2747* | (2011.01) | |
| *H04N 21/2743* | (2011.01) | |
| *H04N 21/441* | (2011.01) | |
| *H04N 21/443* | (2011.01) | |
| *H04N 21/472* | (2011.01) | |

(52) U.S. Cl.
CPC ........... *H04N21/436* (2013.01); *H04N 21/441* (2013.01); *H04N 21/4433* (2013.01); *H04N 21/458* (2013.01); *H04N 21/4788* (2013.01); *H04N 21/47202* (2013.01); *H04N 21/482* (2013.01); *H04N 21/6125* (2013.01); *H04N 21/632* (2013.01); *H04N 21/80* (2013.01); *H04N 21/8133* (2013.01); *H04N 21/84* (2013.01)

(56) References Cited

U.S. PATENT DOCUMENTS

| | | | | |
|---|---|---|---|---|
| 5,841,990 | A | 11/1998 | Picazo et al. | |
| 5,896,382 | A | 4/1999 | Davis et al. | |
| 5,917,997 | A | 6/1999 | Bell et al. | |
| 5,926,478 | A | 7/1999 | Ghaibeh et al. | |
| 5,930,493 | A | 7/1999 | Ottesen et al. | |
| 5,974,453 | A | 10/1999 | Anderson et al. | |
| 6,061,666 | A | 5/2000 | Do et al. | |
| 6,141,688 | A | 10/2000 | Bi et al. | |
| 6,157,377 | A * | 12/2000 | Shah-Nazaroff et al. | 715/719 |
| 6,219,839 | B1 | 4/2001 | Sampsell | |
| 6,233,428 | B1 | 5/2001 | Fryer | |
| 6,249,523 | B1 | 6/2001 | Hrastar et al. | |
| 6,272,129 | B1 | 8/2001 | Dynarski et al. | |
| 6,349,324 | B1 | 2/2002 | Tokoro | |
| 6,480,889 | B1 | 11/2002 | Saito et al. | |
| 6,489,986 | B1 | 12/2002 | Allen | |
| 6,502,193 | B1 | 12/2002 | Barber | |
| 6,563,816 | B1 | 5/2003 | Nodoushani et al. | |
| 6,591,306 | B1 | 7/2003 | Redlich | |
| 6,631,247 | B1 | 10/2003 | Motoyama et al. | |
| 6,631,523 | B1 | 10/2003 | Matthews et al. | |
| 6,636,499 | B1 | 10/2003 | Dowling | |
| 6,640,241 | B1 * | 10/2003 | Ozzie et al. | 709/204 |
| 6,643,658 | B1 | 11/2003 | Jai et al. | |
| 6,654,796 | B1 | 11/2003 | Slater et al. | |
| 6,665,020 | B1 | 12/2003 | Stahl et al. | |
| 6,686,838 | B1 | 2/2004 | Rezvani et al. | |
| 6,693,896 | B1 | 2/2004 | Utsumi et al. | |
| 6,721,955 | B2 | 4/2004 | Khoo et al. | |
| 6,728,239 | B1 | 4/2004 | Kung et al. | |
| 6,735,619 | B1 | 5/2004 | Sawada | |
| 6,760,762 | B2 | 7/2004 | Pezzutti | |
| 6,763,454 | B2 | 7/2004 | Wilson et al. | |
| 6,774,926 | B1 * | 8/2004 | Ellis et al. | 348/14.01 |
| 6,775,262 | B1 | 8/2004 | Skog et al. | |
| 6,782,550 | B1 | 8/2004 | Cao | |
| 6,823,454 | B1 | 11/2004 | Hind et al. | |
| 6,857,009 | B1 | 2/2005 | Ferreria et al. | |
| 6,868,452 | B1 | 3/2005 | Eager et al. | |
| 6,901,439 | B1 | 5/2005 | Bonasia et al. | |
| 6,934,754 | B2 | 8/2005 | West et al. | |
| 6,941,356 | B2 | 9/2005 | Meyerson | |
| 6,950,875 | B1 | 9/2005 | Slaughter et al. | |
| 6,963,358 | B2 | 11/2005 | Cohen et al. | |
| 6,965,581 | B2 | 11/2005 | Nguyen et al. | |
| 6,977,917 | B2 | 12/2005 | Skog et al. | |
| 6,982,953 | B1 | 1/2006 | Swales | |
| 6,996,628 | B2 | 2/2006 | Keane et al. | |
| 7,003,795 | B1 | 2/2006 | Allen | |
| 7,010,303 | B2 | 3/2006 | Lewis et al. | |
| 7,020,694 | B2 | 3/2006 | Saito et al. | |
| 7,035,271 | B1 | 4/2006 | Peterson | |
| 7,039,391 | B2 | 5/2006 | Rezvani et al. | |
| 7,055,104 | B1 | 5/2006 | Billmaier et al. | |
| 7,065,778 | B1 | 6/2006 | Lu | |
| 7,069,312 | B2 | 6/2006 | Kostic et al. | |
| 7,075,573 | B2 | 7/2006 | Imaeda | |
| 7,079,527 | B2 | 7/2006 | Owens | |
| 7,080,400 | B1 * | 7/2006 | Navar | 725/139 |
| 7,089,579 | B1 | 8/2006 | Mao et al. | |
| 7,114,070 | B1 | 9/2006 | Willming et al. | |
| 7,117,267 | B2 * | 10/2006 | Bavadekar | 709/230 |
| 7,130,895 | B2 | 10/2006 | Zintel et al. | |
| 7,146,632 | B2 | 12/2006 | Miller | |
| 7,165,109 | B2 | 1/2007 | Chiloyan et al. | |
| 7,197,550 | B2 | 3/2007 | Cheline et al. | |
| 7,213,061 | B1 | 5/2007 | Hite et al | |
| 7,234,117 | B2 | 6/2007 | Zaner et al. | |
| 7,243,132 | B2 | 7/2007 | Choi | |
| 7,243,141 | B2 | 7/2007 | Harris | |
| 7,272,137 | B2 | 9/2007 | Unitt et al. | |
| 7,280,546 | B1 | 10/2007 | Sharma et al. | |
| 7,281,261 | B2 * | 10/2007 | Jaff et al. | 725/132 |
| 7,296,283 | B2 | 11/2007 | Hrastar et al. | |
| 7,299,304 | B2 | 11/2007 | Saint-Hilaire et al. | |
| 7,299,488 | B2 | 11/2007 | Brodigan et al. | |
| 7,302,487 | B2 | 11/2007 | Ylonen et al. | |
| 7,308,575 | B2 | 12/2007 | Basil et al. | |
| 7,313,384 | B1 | 12/2007 | Meenan et al. | |
| 7,313,606 | B2 | 12/2007 | Donahue et al. | |
| 7,316,022 | B2 | 1/2008 | Nishio | |
| 7,328,266 | B2 | 2/2008 | Schmidt et al. | |
| 7,349,967 | B2 | 3/2008 | Wang | |
| 7,370,091 | B1 | 5/2008 | Slaughter et al. | |
| 7,483,985 | B2 | 1/2009 | Karaoguz et al. | |
| 7,496,647 | B2 | 2/2009 | Karaoguz et al. | |
| 7,496,665 | B2 | 2/2009 | Karaoguz et al. | |
| 7,506,355 | B2 * | 3/2009 | Ludvig et al. | 725/112 |
| 7,734,788 | B2 | 6/2010 | Karaoguz et al. | |
| 7,836,297 | B2 | 11/2010 | Karaoguz et al. | |
| 7,970,908 | B2 | 6/2011 | Karaoguz et al. | |
| 2001/0004768 | A1 | 6/2001 | Hodge et al. | |
| 2001/0030785 | A1 | 10/2001 | Pangrac et al. | |
| 2001/0034708 | A1 * | 10/2001 | Walker et al. | 705/51 |
| 2002/0016971 | A1 * | 2/2002 | Berezowski et al. | 725/105 |
| 2002/0042924 | A1 | 4/2002 | Adams | |
| 2002/0053081 | A1 * | 5/2002 | Griggs | 725/39 |
| 2002/0059163 | A1 | 5/2002 | Smith | |
| 2002/0059621 | A1 * | 5/2002 | Thomas et al. | 725/87 |
| 2002/0065828 | A1 | 5/2002 | Goodspeed | |
| 2002/0069420 | A1 * | 6/2002 | Russell et al. | 725/92 |
| 2002/0078161 | A1 | 6/2002 | Cheng | |
| 2002/0104093 | A1 | 8/2002 | Buehl et al. | |
| 2002/0104098 | A1 * | 8/2002 | Zustak et al. | 725/131 |
| 2002/0104099 | A1 | 8/2002 | Novak | |
| 2002/0116464 | A1 | 8/2002 | Mak | |
| 2002/0144279 | A1 * | 10/2002 | Zhou | 725/95 |
| 2002/0152311 | A1 | 10/2002 | Veltman et al. | |
| 2002/0154337 | A1 | 10/2002 | Sakata | |
| 2002/0184631 | A1 * | 12/2002 | Cezeaux et al. | 725/44 |
| 2003/0004916 | A1 | 1/2003 | Lewis | |
| 2003/0043272 | A1 | 3/2003 | Nagao et al. | |
| 2003/0056008 | A1 | 3/2003 | Russell et al. | |
| 2003/0061315 | A1 | 3/2003 | Jin | |
| 2003/0078968 | A1 | 4/2003 | Needham et al. | |
| 2003/0079124 | A1 | 4/2003 | Serebrennikov | |
| 2003/0081619 | A1 | 5/2003 | Phillips et al. | |

(56) References Cited

U.S. PATENT DOCUMENTS

| | | |
|---|---|---|
| 2003/0083048 A1 | 5/2003 | Robinson et al. |
| 2003/0084173 A1 | 5/2003 | Deleu et al. |
| 2003/0088420 A1 | 5/2003 | alSafadi et al. |
| 2003/0112467 A1 | 6/2003 | McCollum et al. |
| 2003/0115585 A1 | 6/2003 | Barsness |
| 2003/0154285 A1 | 8/2003 | Berglund et al. |
| 2003/0225864 A1 | 12/2003 | Gardiner et al. |
| 2003/0237097 A1 | 12/2003 | Marshall et al. |
| 2004/0003040 A1 | 1/2004 | Beavers |
| 2004/0003051 A1 | 1/2004 | Krzyzanowski et al. |
| 2004/0015993 A1 * | 1/2004 | Yacenda et al. ............ 725/87 |
| 2004/0045035 A1 | 3/2004 | Cummings et al. |
| 2004/0117824 A1 | 6/2004 | Karaoguz et al. |
| 2004/0117834 A1 | 6/2004 | Karaoguz et al. |
| 2004/0117842 A1 | 6/2004 | Karaoguz et al. |
| 2004/0243671 A9 | 12/2004 | Needham et al. |
| 2005/0028208 A1 | 2/2005 | Ellis et al. |
| 2007/0174886 A1 | 7/2007 | Scheuer et al. |
| 2007/0198738 A1 | 8/2007 | Angiolillo et al. |
| 2007/0220580 A1 | 9/2007 | Putterman et al. |
| 2009/0282098 A1 | 11/2009 | Karaoguz et al. |
| 2010/0245606 A1 | 9/2010 | Karaoguz et al. |
| 2011/0072155 A1 | 3/2011 | Karaoguz et al. |

FOREIGN PATENT DOCUMENTS

| | | |
|---|---|---|
| WO | 01/31472 | 5/2001 |
| WO | 01/46818 | 6/2001 |
| WO | 01/71983 | 9/2001 |
| WO | 02/30116 | 4/2002 |

OTHER PUBLICATIONS

Tokmakoff A et al., "Home Media Server Content Management", proceedings of the Spie, Spie, Bellingham, VA, US vol. 4519, Aug. 22, 2001, pp. 168-179, XP009017768, ISSN: 02770786X.

Communication with European Search Report for Application No. 04001226.2 mailed Sep. 3, 2007.

Share it! Deliverable #3, Nov. 30, 2002, pp. 1-93.

Communication pursuant to Article 94(3) EPC for European Patent Application No. 04001227.0-2413, dated Dec. 11, 2009.

Moh M et al, "Mobile IP Telephony: Mobility Support of SIP", Computer Communications and Networks, 1999, Proceedings, Eigth International Conference in Boston, MA, USA, Oct. 11-13, 1999, Piscataway, NJ, USA, IEEE, Oct. 11, 1999, pp. 554-559, XP010359588 ISBN: 0-7803-5794-9.

Schulzrine H et al, "Application-Layer Mobility Using SIP", Service Portability and Virtual Customer Environments, 2000 IEEE San Francisco, CA, USA, Dec. 1, 2000, Piscataway, NJ, USA, IEEE, pp. 29-36, XP010551460 ISBN: 0-7803-7133-X.

ReplayTV4000userguide, 2001, SONICblue Inc.

Communication with European Search Report for Application No. 04001227.2-2413, mailed Nov. 22, 2005.

* cited by examiner

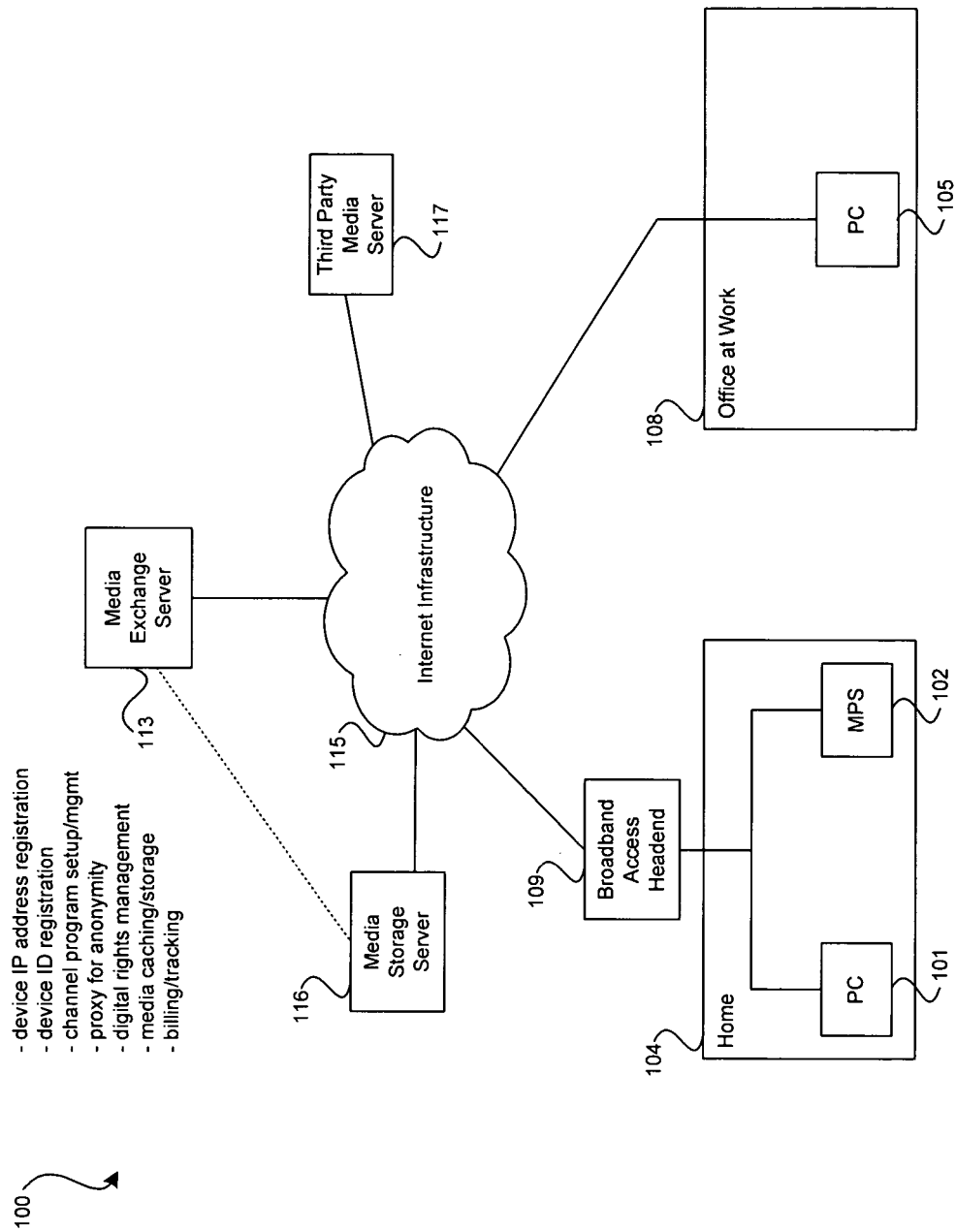

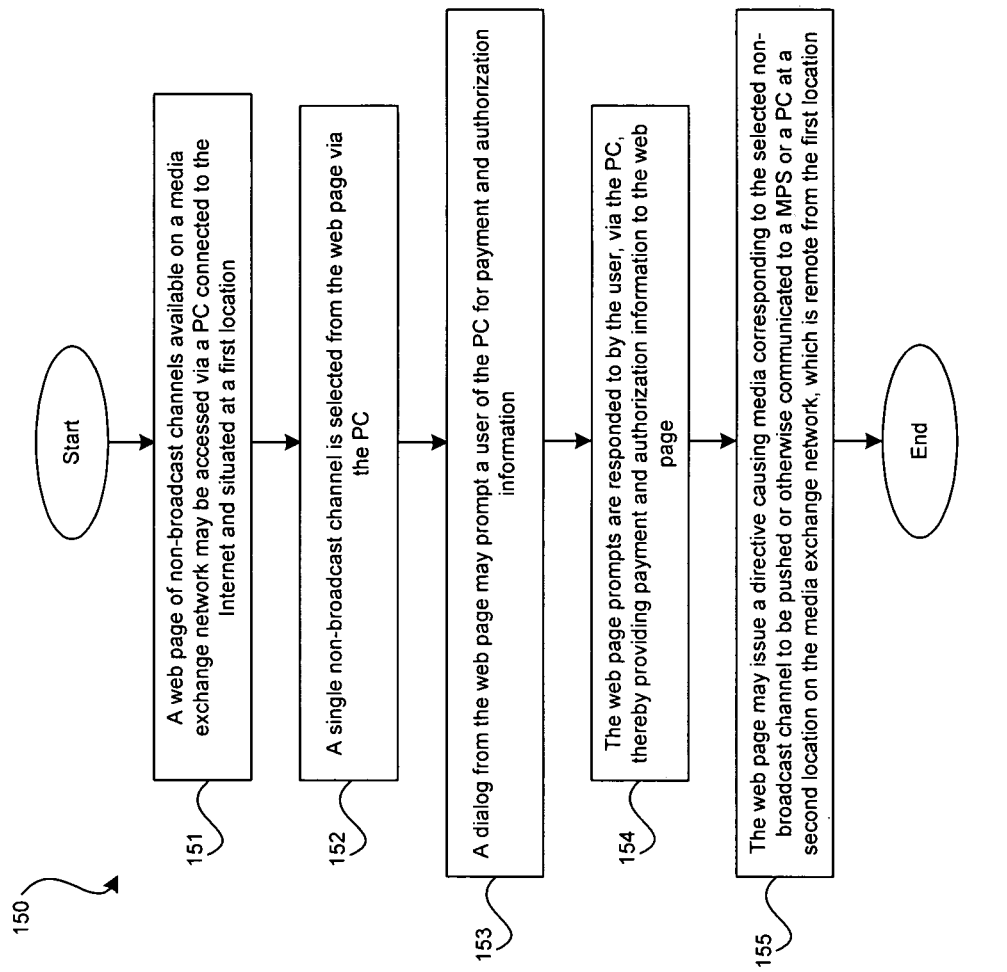

| CHANNELS | HOUR, DAY | | | | |
|---|---|---|---|---|---|
| | << 1PM | 2PM | ... | 6PM | 7PM >> |
| Family Vacations | | | | | |
| Kids sports | | | | | |
| ... | | | | | |
| Vacation in Alaska Video    802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video    803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video    804 | Overnight Delivery: available Next Morning Cost: $0.05 (Server Stored) | | Showing All day (48 mins) Earliest Order Time: 4:00 PM MPEG-2, 19 Mbps | | |

THIRD PARTY MEDIA CHANNEL ACCESS IN A MEDIA EXCHANGE NETWORK

CROSS-REFERENCE TO RELATED APPLICATIONS/INCORPORATION BY REFERENCE

This application makes reference to, claims priority to, and claims the benefit of:
U.S. Provisional Application Ser. No. 60/432,472 filed Dec. 11, 2002;
U.S. Provisional Application Ser. No. 60/443,894 filed Jan. 30, 2003;
U.S. Provisional Application Ser. No. 60/457,179 filed Mar. 25, 2003;
U.S. Provisional Application Ser. No. 60/473,696 filed May 28, 2003;
U.S. Provisional Application Ser. No. 60/465,982 filed Apr. 28, 2003; and
U.S. Provisional Application Ser. No. 60/448,658 filed Feb. 18, 2003.

This application also makes reference to:
U.S. application Ser. No. 10/657,390 filed Sep. 8, 2003;
U.S. application Ser. No. 10/660,267 filed Sep. 11, 2003; and
U.S. Provisional Application Ser. No. 60/465,982 filed on Apr. 28, 2003.

All of the above stated applications are incorporated herein by reference in their entirety.

FIELD OF THE INVENTION

Certain embodiments of the invention relate to accessing media. In particular, certain embodiments of the invention relate to a method and system for third ($3^{rd}$) party media access in a media exchange network.

BACKGROUND OF THE INVENTION

A personal computer (PC) employing a web browser is often utilized to search for media, data, and services distributed over various web sites on the Internet. Often, a user is not aware of web sites that are available on the Internet and the type of media, data, and services they might provide. Accordingly, a user typically utilizes a search engine service to look for web sites in order to find media, data, and services that are available on the Internet which are of interest to the user. However, the user is limited to media, data, and services that are on the Internet.

Set-top-boxes today may be configured via telephone by talking to a customer service representative. Due to limited programming content and a finite number of television stations, ordering programs via a set-top-box may be very restricted. Although pay-per-view (PPV) programming may provide a solution, pay-per-view programming is limited since programming is available only in certain time slots. Accordingly, the ordering time is limited to a specified period. Furthermore, the numbers of pay-per-view channels are also limited.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain aspects of the invention may be found in a method and system for providing media in a communication network. Aspects of the method for providing media in a communication network may comprise generating a request from a first location to receive media from a non-broadcast channel provider. Payment and/or authorization information may be provided to the non-broadcast channel provider and the media may accordingly be transferred from a storage location other than the non-broadcast channel provider to the first location. A representation of the received media may be presented in a media guide and/or a channel guide at the first location and the received media may be consumed at the first location. The method may further comprise the step of requesting that the received media be transferred from the storage location to a second location. In this regard, an identifier of the second location may be transferred to the non-broadcast channel provider so that media may be transferred to the second location.

In another aspect of the invention, a representation of the transferred media may be presented in a media guide and/or a channel guide at the second location and the media may accordingly be selected and consumed at the second location. The non-broadcast channel provider may be adapted to authorize the storage location to transfer the media directly to the first location and/or the second location. The non-broadcast channel provider may be searched in order to identify information that may be related to the media based on the generated request.

Another embodiment of the invention may provide a machine-readable storage, having stored thereon, a computer program having at least one code section for providing media in a communication network. The at least one code section may be executable by a machine, thereby causing the machine to perform the steps as described above for providing media in a communication network.

Certain embodiments of the system for providing media in a communication network may comprise at least one processor that generates a request from a first location to receive media from a non-broadcast channel provider. The processor may be a media processing system processor, a media management system processor, a computer processor, a media exchange software processor and a media peripheral processor. Notwithstanding, the processor may provide payment and/or authorization information to the non-broadcast channel provider and may receive the media from a storage location other than non-broadcast channel provider.

Upon receiving the media, the processor may cause a representation of the received media to be presented in a media guide and/or a channel guide at the first location and the received media may be consumed at the first location. The processor may also be configured to request that the received media be transferred from the storage location to a second location. In this regard, an identifier of the second location may be transferred by the processor to the non-broadcast channel provider so that media may be transferred directly to the second location.

In another aspect of the invention, the processor may cause a representation of the transferred media to be presented in a media guide and/or a channel guide at the second location and the media to be selected and consumed at the second location. The non-broadcast channel provider may be searched in order to identify information that may be related to the media based on the generated request. The non-broadcast channel provider may be adapted to authorize the storage location to transfer the media to the first location and/or the second location.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram illustrating an embodiment of a media exchange network 100 that may be utilized in connection with supporting third party media channel access, in accordance with various aspects of the present invention.

FIG. 1B is a flowchart illustrating a first embodiment of an exemplary method 150 that may be utilized to provide third party media channel access on the media exchange network 100 of FIG. 1A, in accordance with various aspects of the present invention.

FIG. 8 is an exemplary illustration of a TV guide channel user interface showing several options of a pushed media in accordance with an embodiment of the present invention.

DETAILED DESCRIPTION OF THE INVENTION

Figure 2A:
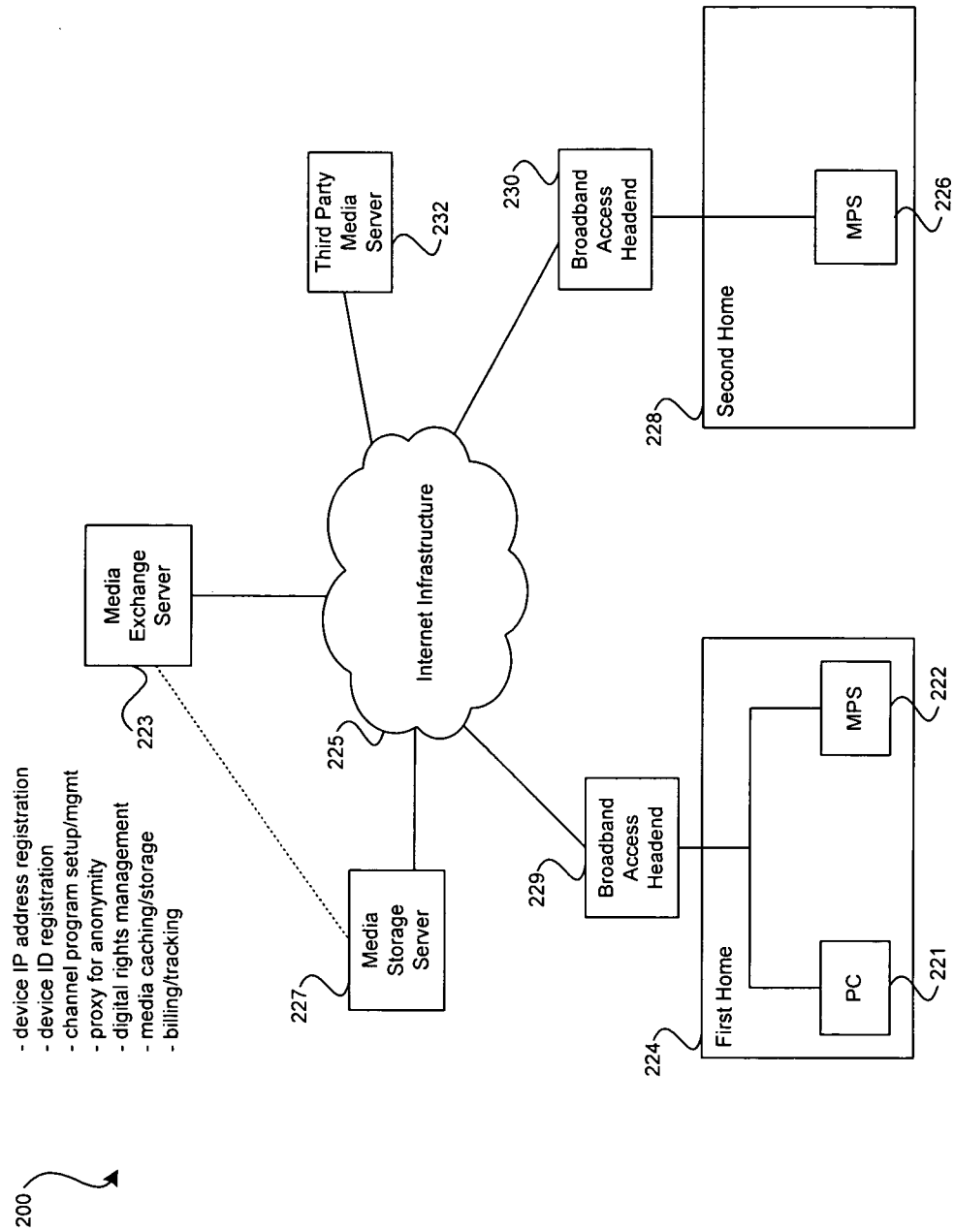
FIG. 2A is a diagram illustrating a second embodiment of a media exchange network 200 supporting third party media channel access, in accordance with various aspects of the present invention.

Certain aspects of the invention may be found in a method and system for providing media in a communication network. Various aspects of the method may comprise the step of generating a request from a first location to receive media from a non-broadcast channel provider. Payment and/or authorization information may be provided to the non-broadcast channel provider and the media may accordingly be transferred from a storage location other than the non-broadcast channel provider to the first location. A representation of the received media may be presented in a media guide and/or a channel guide that is displayed at the first location and the received media may be consumed at the first location.

The method may also comprise the step of requesting that the received media be transferred from the storage location to a second location. In this regard, an identifier of the second location may be transferred to the non-broadcast channel provider so that media may be transferred to the second location. A representation of the transferred media may be presented in a media guide and/or a channel guide displayed at the second location and the media may accordingly be selected and consumed at the second location. The non-broadcast channel provider may be adapted to authorize the storage location to transfer the media directly to the first location and/or the second location. The non-broadcast channel provider may be searched in order to identify information that may be related to the media based on the generated request.

FIG. 1A is a diagram illustrating an embodiment of a media exchange network 100 that may be utilized in connection with supporting third party media channel access, in accordance with various aspects of the present invention. Referring to FIG. 1A, the media exchange network 100 is a communication network comprising a first location such as a first home 104, a second location such as an office at work 108, a broadband access headend 109, an Internet infrastructure 115, a media storage server 116, a third ($3^{rd}$) party media server 117 and a media exchange server 113. Each of the broadband access headend 109, media storage server 116, third ($3^{rd}$) party media server 117 and media exchange server 113 may be coupled to the Internet infrastructure 115 via a wired and/or wireless connection. The media exchange network 100 may be a communication network that may be adapted to communicate and transfer media among entities coupled to the media exchange network 100.

The first location or first home 104 may comprise a personal computer 101 and a media processing system 102. The personal computer 101 and the media processing system 102 may interface with the broadband access headend 109. Each of the personal computer 101 and the media processing system 102 may include an internal modem such as a cable modem, digital subscriber line (DSL) modem or other interface devices that may be utilized to communicate with the broadband access headend 109. However, the invention is not limited in this regard and the interface device such as the modem may be externally coupled to the personal computer 101 and the media processing system 102.

The second location may comprise a personal computer 105 that may also be interfaced with the broadband access headend 109. The personal computer 105 located at the office at work 108 may interface directly with the Internet infrastructure 115 via, for example, a dial-up connection over telephone lines. The personal computers 101, 105 may comprise desktop personal computers, notebook personal computers, personal computer tablets, handheld computers, personal digital assistants (PDAs), media peripherals or any other computing device.

The broadband access headend 109 may comprise a cable headend, a satellite headend, or a digital subscriber line (DSL) DSL headend, in accordance with various embodiments of the invention. In an aspect of the invention, a broadband access headend may be upgraded to a media exchange headend by adding functionality to facilitate the exchange of media on the media exchange network 100 in conjunction with the media exchange server 113. Exemplary functionalities that may be added may include, but are not limited to, distributed networking capability, archival functionality such as long term media storage, temporary storage such as caching to aid in the distribution and routing of media, storage management, and digital rights management.

Although only single media exchange server 113 and a single third (3rd) party media server 117 are illustrated within the media exchange network 100, the invention is not so limited. In this regard, the media exchange network may include a plurality of media exchange servers 103 and a plurality of third (3rd) party media servers. Accordingly, the media exchange network or communication network 100 may be referred to as a multiserver environment comprising a plurality of servers coupled to the Internet infrastructure 115. Each of the multiple servers may provide a different type of service to each of the home 104 and the office at work 108. For example, a first server may provide broadcast media while a second server may provide subscription based movies. Still, a third server may be a web server operated as a web portal by an Internet service provider (ISP), for example.

The media exchange server 113 may be adapted to provide various network based functionalities for the media exchange network 100. Exemplary network functionalities may include, but are not limited to, device IP address registration, device ID registration, channel/program setup and management, serving as a proxy for anonymity, digital rights management, media caching/storage and/or billing and service tracking. In accordance with various embodiments of the invention, the media exchange server 113 may comprise a single centrally located server or may comprise many distributed servers or server elements located throughout the media exchange network 100.

The third (3rd) party media server 117 may comprise any of a number of providers of digital media including, for example, an on-demand movie provider, an advertiser, and an on-demand music provider. The third (3rd) party media server 117 may store and distribute movies, video, user profiles, and other digital media and/or information that may be provided to users and subscribers of the media exchange network 100.

The media exchange network or communication network 100 may also comprise a media storage server 116 interfacing to the Internet infrastructure 115. The media storage server 116 may include suitable hardware and/or software that may be adapted to interact with the media exchange server 113. The media storage server 116 may provide temporary and/or archival storage for digital media on the media exchange network 100. For example, the media storage server 116 may temporarily store media files that are addressed to certain media processing systems and/or personal computers coupled to the media exchange network 100. This temporary storing of media may occur in instances where a device may be powered off, out of service, offline and/or currently busy. However, once a device becomes active on the network or is no longer busy, the temporarily stored media may be transferred to the device. For example, a device may be offline in periods when the device may be undergoing maintenance. However, once the maintenance is complete, the device may enter an online status and media stored in the media storage server 116 may be transferred to the device.

The various elements of the media exchange network 100 may include storage locations for digital media and data. The storage locations may comprise, for example, hard disk drives, a digital versatile disc (DVD) player, a compact disc (CD) player, floppy disk drives, pen drives, microdrives, random access memory (RAM), or any combination of these. The storage locations may also include, for example, memory cards, PCMCIA cards, compact flash cards, or any combination thereof.

In accordance with an embodiment of the invention, the media processing system 102 may be an enhanced set-top-box. Notwithstanding, the media processing system 102 may include a television screen for viewing and interacting with various user interfaces, media, data, and/or services that may be available on the media exchange network 100. In this regard a remote control may be utilized to control various functionalities that may be displayed on a user interface of a television screen coupled to a media processing system. Also, the personal computer 101 may include a computer monitor for viewing and interacting with various user interfaces, media, data, and services that are available on the media exchange network using, for example, a keyboard, mouse and/or other I/O device. Exemplary user interfaces that may be displayed on a television screen and/or a personal computer monitor may include a device view or device guide, a media view or media guide and/or a channel view or channel guide. The media processing system 102 and personal computer 101 may include software that may be adapted to support interaction on the media exchange network 100, in accordance with various embodiments of the invention.

U.S. application Ser. No. 10/675,382 filed Sep. 30, 2003 and U.S. patent application Ser. No. 10/675,467 filed Sep. 30, 2003 provides exemplary media view or guide, device view or guide, and channel view or guide, and are hereby incorporated herein by reference in their entirety.

In accordance with an embodiment of the invention, the media processing system 102 and/or personal computer 101 may comprise browsing and searching capability on the media exchange network 100, as described in U.S. Provisional Application Ser. No. 60/448,658, filed on Feb. 18, 2003 and which is incorporated herein by reference in its entirety. The browsing and searching capability may be integrated, for example, in at least one of the media guide, device guide, and/or channel guide or may be provided as a separate user interface that may be viewed on a television screen and/or a personal computer monitor. Other embodiments of the present invention may comprise various combinations and/or multiple instantiations of the elements of FIG. 1A, in accordance with various aspects of the invention, including media peripheral devices such as, for example, digital cameras, digital camcorders, Jukeboxes, and MP3 players.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

FIG. 1B is a flowchart illustrating a first embodiment of an exemplary method 150 that may be utilized to provide third party media channel access on the media exchange network 100 of FIG. 1A, in accordance with various aspects of the present invention. Referring to FIG. 1B, in step 151, a web page of non-broadcast channels available on a media exchange network may be accessed via a personal computer connected to the Internet and situated at a first location. In step 152, a single non-broadcast channel is selected from the web page via the personal computer. In step 153, a dialog from the web page may prompt a user of the personal computer for a required payment and authorization information. In step 154, the web page prompts are responded to by the user, via the personal computer, thereby providing the required payment and authorization information. In step 155, the web page may issue a directive causing media corresponding to the selected non-broadcast channel to be pushed or otherwise communicated to a media processing system or a personal computer at a second location on the media exchange network, which is remote from the first location, via the media exchange network.

In an illustrative embodiment of the invention, with reference to FIG. 1A, a user of the personal computer 105 located at the office at work 108 may have a desire to search for and access a video channel regarding how to build a deck on the back of home. The user may access a web site utilizing the personal computer 105 that is connected to the Internet infrastructure 115. The web site may be hosted on a server on the Internet infrastructure 115, for example. In this regard, the web site may be hosted by the third ($3^{rd}$) party media server 117. Notwithstanding, based on the search of the website, the user may identify and locate the desired video channel. Accordingly, the web site may generate one or more dialogs that may prompt the user for payment information so that access may be granted to the desired video channel. The payment information may include for example, a credit card number or bank account information and the authorization information may include an access code, password and/or a media destination identification (ID).

After payment and authorization is complete and valid, the web site may make arrangements to deliver the desired video to the user. The desired video channel may actually be stored on the media storage server 116 on the media exchange network 100. In this regard, the web site may arrange with the media storage server 116 to push or otherwise communicate media corresponding to the desired video such as the desired video channel to the media processing system 102 at the user's home 104. Arranging with the media storage server 116 to push or otherwise communicate media corresponding to the desired video may include reconciling payment and authorization information with the media storage server 116.

As a result, the desired video channel may be ready to be viewed by the user when the user returns to the home 104 after work, for example. Accordingly, when the user turns on the media processing system 102, data representative of the desire video may appears in, for example, a channel guide of the media processing system 102.

In accordance with another embodiment of the invention, the media exchange server 113 may operate as a proxy between the media processing system 102, the media storage server 116 and the web site. In this regard, the web site may pass the request, payment information and/or authorization information to the media exchange server 113. The media exchange server 113 may then interact or communicate with the media storage server 116 to coordinate access and/or push or otherwise communicate the video channel to the media processing system 102 over the media exchange network 100 while keeping the user and network details corresponding to the media processing system 102 anonymous with respect to the media storage server 116 and the web site. Details of such an anonymous exchange are disclosed in U.S. application Ser. No. 10/675,774 filed on Sep. 30, 2003, which is incorporated herein by reference in its entirety.

FIG. 2A is a diagram illustrating a second embodiment of a media exchange network 200 supporting third party media channel access, in accordance with various aspects of the present invention. Referring to FIG. 2A, the media exchange network 200 is a communication network comprising a first location such as a first home 224, a second location such as a second home 228, a broadband access headends 229, 230 an Internet infrastructure 225, a media storage server 227, a third ($3^{rd}$) party media server 232 and a media exchange server 223. Each of the broadband access headend 229, 230, media storage server 227, third ($3^{rd}$) party media server 232 and media exchange server 223 may be coupled to the Internet infrastructure 225 via a wired and/or wireless connection. The media exchange network 200 may be a communication network that may be adapted to communicate and transfer media among entities coupled to the media exchange network 200.

The first location or first home 224 may comprise a personal computer 221 and a media processing system 222. The personal computer 221 and the media processing system 222 may interface with Internet infrastructure 225 via the broadband access headend 229. Each of the personal computer 221 and the media processing system 222 may include an internal modem such as a cable modem, digital subscriber line (DSL) modem or other interface devices that may be utilized to communicate with the broadband access headend 229. However, the invention is not limited in this regard and the interface device such as the modem may be externally coupled to the personal computer 221 and the media processing system 222. The personal computers 221 may comprise a desktop personal computer, notebook personal computer, personal computer tablet, handheld computer, personal digital assistant (PDA), media peripheral or any other computing device.

The second location or second home 228 may comprise a media processing system that may also interface to the Internet infrastructure 225 via the broadband access headend 230. The media processing system 226 located at the second home 228 may interface directly with the Internet infrastructure 225 via, for example, a cable modem or a DSL modem.

The broadband access headends 229, 230 may comprise a cable headend, a satellite headend, or a digital subscriber line (DSL) headend, in accordance with various embodiments of the invention. In an aspect of the invention, a broadband access headend may be upgraded to a media exchange headend by adding functionality to facilitate the exchange of media on the media exchange network 200 in conjunction with the media exchange server 223. Exemplary functionalities that may be added may include, but are not limited to, distributed networking capability, archival functionality such as long term media storage, temporary storage such as caching to aid in the distribution and routing of media, storage management, and digital rights management.

The media storage server 227, media exchange server 223 and the third party media server 232 are all coupled to the Internet infrastructure 225 may be adapted to function in a similar manner as their counterparts in the communication network 100 of FIG. 1A.

Figure 2B:
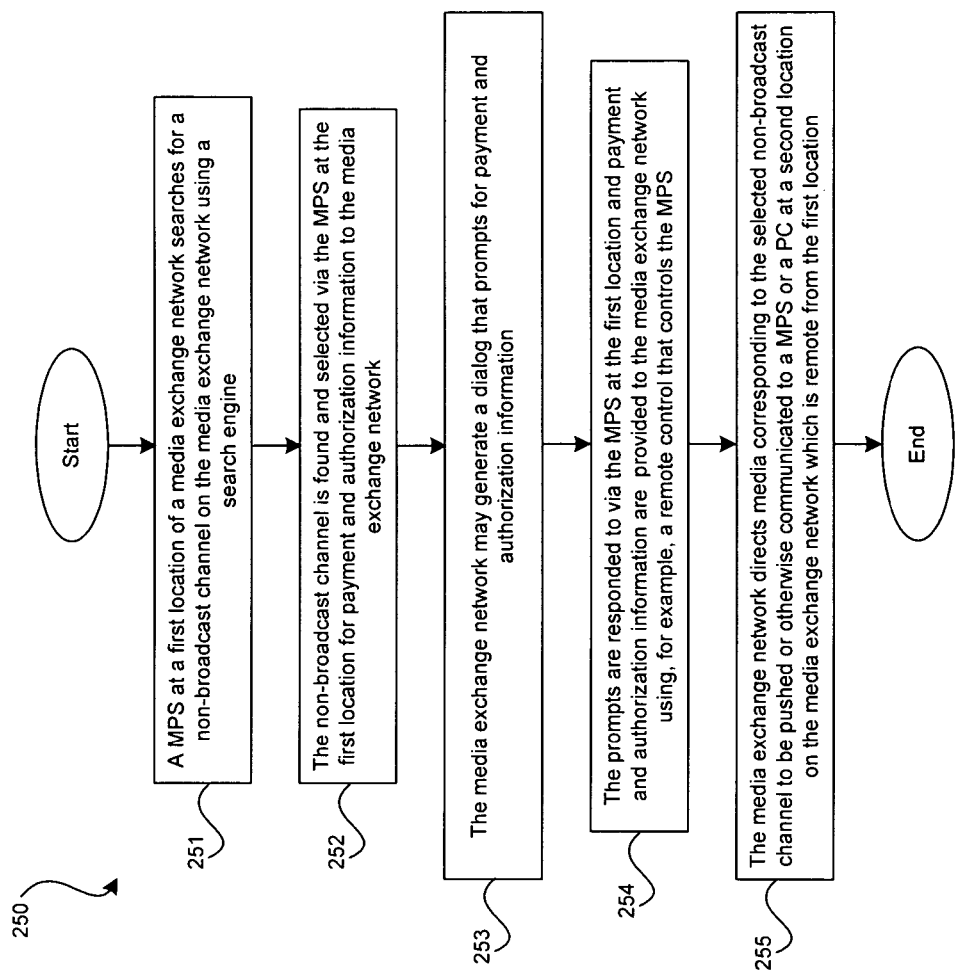
FIG. 2B is a flowchart illustrating a second embodiment of a method 250 that may be utilized in connection with providing third party media channel access on the media exchange network 200 of FIG. 2A, in accordance with various aspects of the present invention.

FIG. 2B is a flowchart illustrating a second embodiment of a method 250 that may be utilized in connection with providing third party media channel access on the media exchange network 200 of FIG. 2A, in accordance with various aspects of the present invention. Referring to FIG. 2B, in step 251, a media processing system at a first location on a media exchange network searches for a non-broadcast channel on the media exchange network using a search engine according to the principles disclosed in U.S. Provisional Application Ser. No. 60/448,658 filed on Feb. 18, 2003 and incorporated by reference herein in its entirety. In step 252, the non-broadcast channel is found and selected via the media processing system on the media exchange network utilizing, for example, a remote control. In step 253, the media exchange network may generate a dialog that prompts the media processing system for payment and authorization information. In step 254, the prompts are responded to via the media processing system at the first location and payment and authorization information are provided to the media exchange network using, for example, a remote control that controls the media processing system. In step 255, the media exchange network directs that media corresponding to the selected non-broadcast channel be pushed or otherwise communicated to a media processing system or a personal computer at a second location on the media exchange network which is remote from the first location.

In an illustrative embodiment of the invention, with reference FIG. 2A, a user such as Son, of the media processing system 226 located at the second home 228 may have a desire to access a music audio channel comprising classical music for Mom who is located at the first home 224. In other words, Son located at the second home 228 wants the desired music audio channel to be communicated to Mom at the personal computer 221 located at the first home 224. The user, Son, of the media processing system 226 may perform a search on the media exchange network 200, using, for example, a remote control in conjunction with the media processing system 226 and discovers or locates a classical music channel on the third ($3^{rd}$) party media server 232. The user, Son, of the media processing system 226, using the remote control, may select the classical music channel and the third (3d) party media server 232 may generate a dialog that prompts the media processing system 226 for payment and authorization information.

The user of the media processing system 226 may respond to the prompts by providing, for example, a payment account number, a password, and media destination information, using the remote control. The media destination information may comprise an identification number or address of the personal computer 221 located at the first home 224. The third ($3^{rd}$) party media server 232 may authorize the push or other communication of the channel, reconcile payment based on the account number, and push or otherwise communicate media corresponding to the classical music channel to mother's personal computer 221 via the media exchange network 200. As a result, media corresponding to the desired classical music channel will be ready to be consumed by mom via the personal computer 221 at the first home 224. Accordingly, Mom may consume the corresponding media for the classical music channel by, for example, playing the corresponding media on the personal computer 221. In accordance with an embodiment of the invention, when the Mom, turns on the personal computer 221, a representation of the media for the classical music channel may appear in a channel guide displayed on a monitor for the personal computer 221.

In accordance with another embodiment of the invention, the media exchange server 223 may be adapted to function as a proxy between the media processing system 226 and the third (3rd) party media server 232. In such an embodiment, the exchange of information between the media processing system 226, the third (3rd) party media server 232, and the personal computer 221 may be handled by the media exchange server 223. In this regard, an identity of the media processing system 226 and the personal computer 221 may be kept anonymous with respect to the third (3rd) party media server 232. Details of such an anonymous exchange are provided in U.S. application Ser. No. 10/675,774 filed on Sep. 30, 2003, which is incorporated herein by reference in its entirety.

In accordance with an alternative embodiment of the present invention, multiple channels may be selected by a user of a media processing system or a personal computer at a first location and pushed to a personal computer or a media processing system at a second location on a media exchange network.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner.

Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
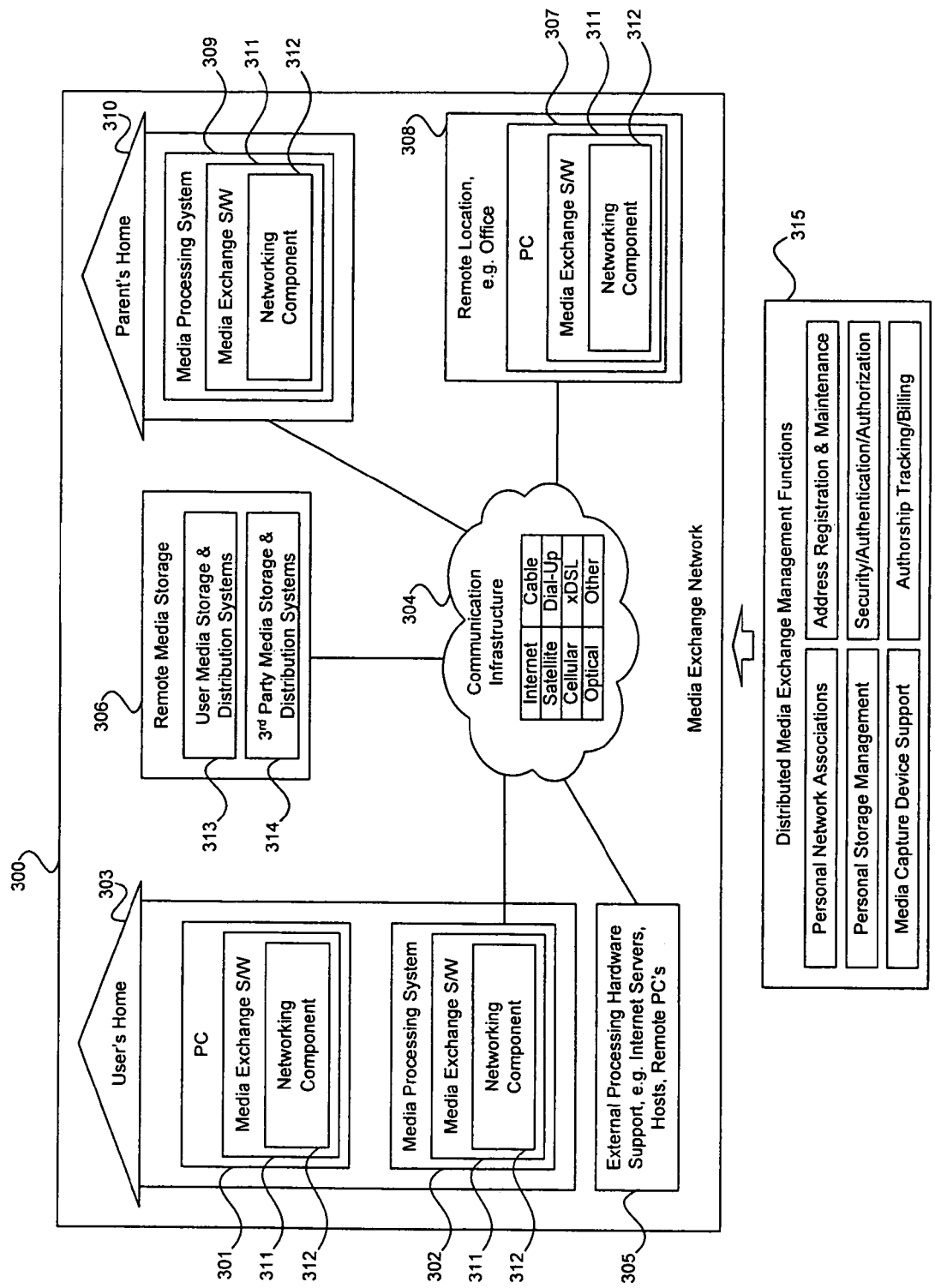
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
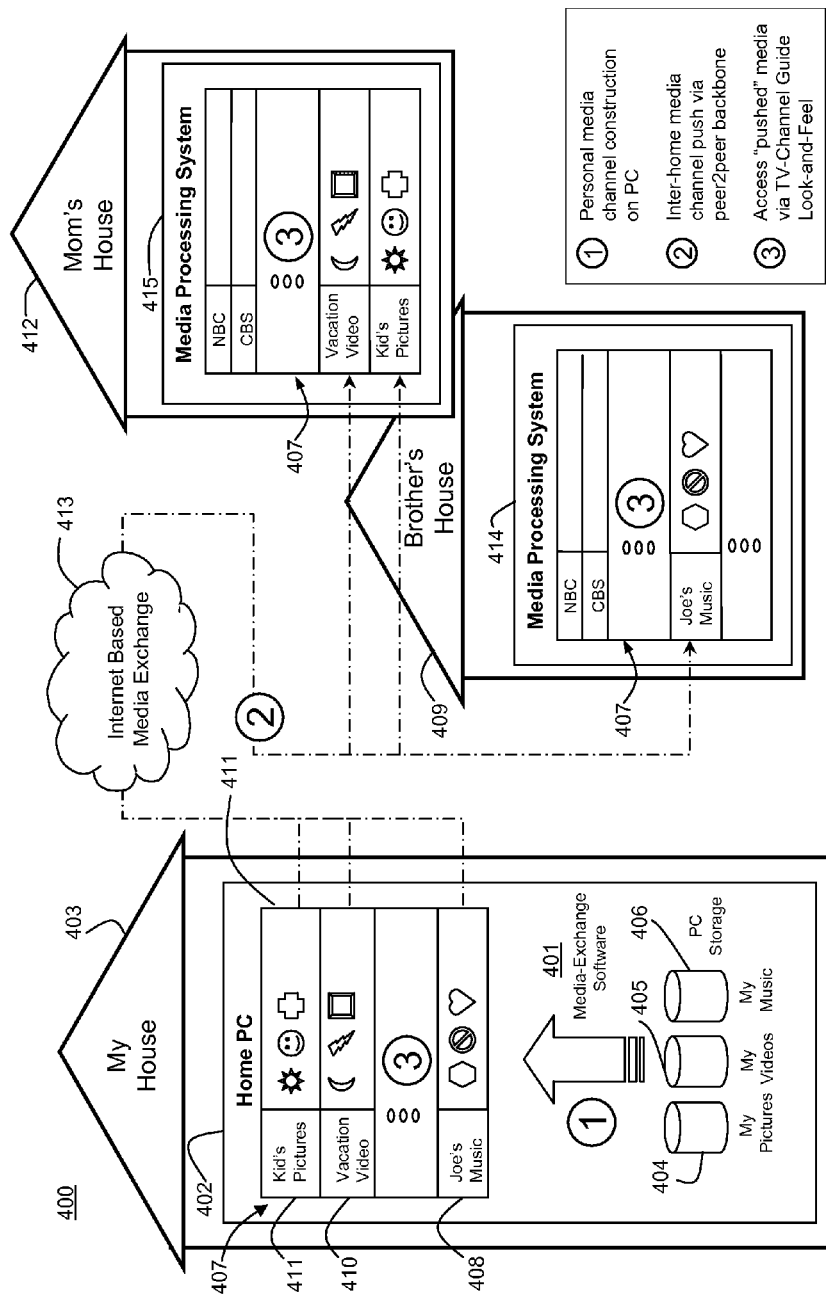
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
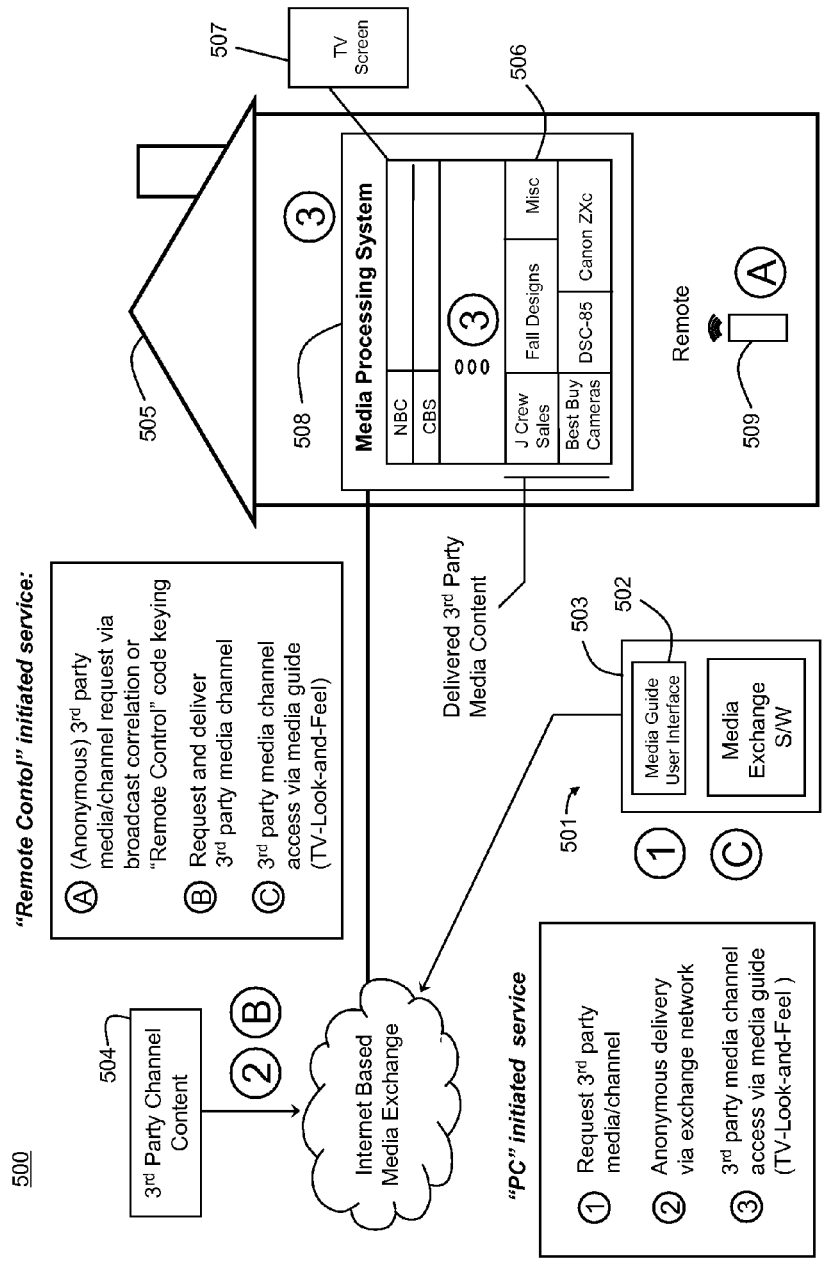
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
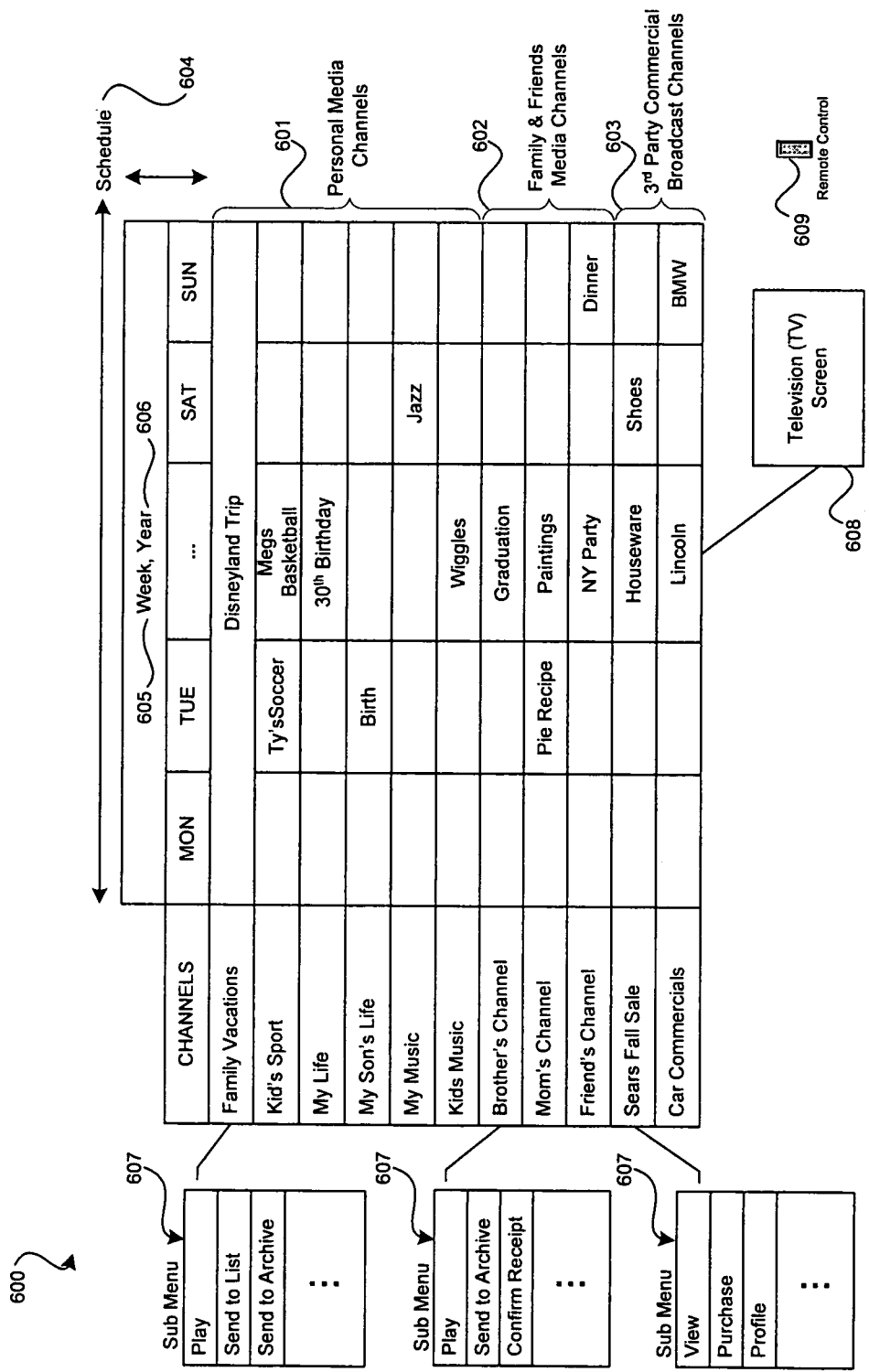
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
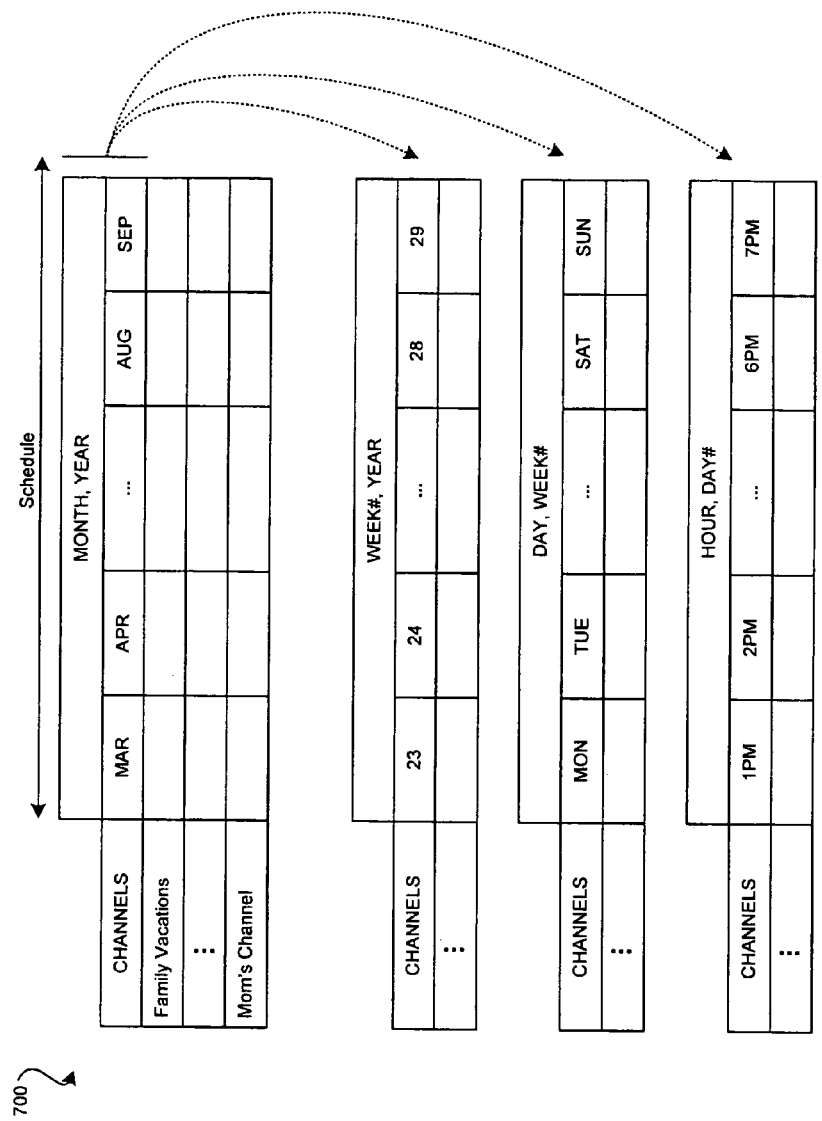
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
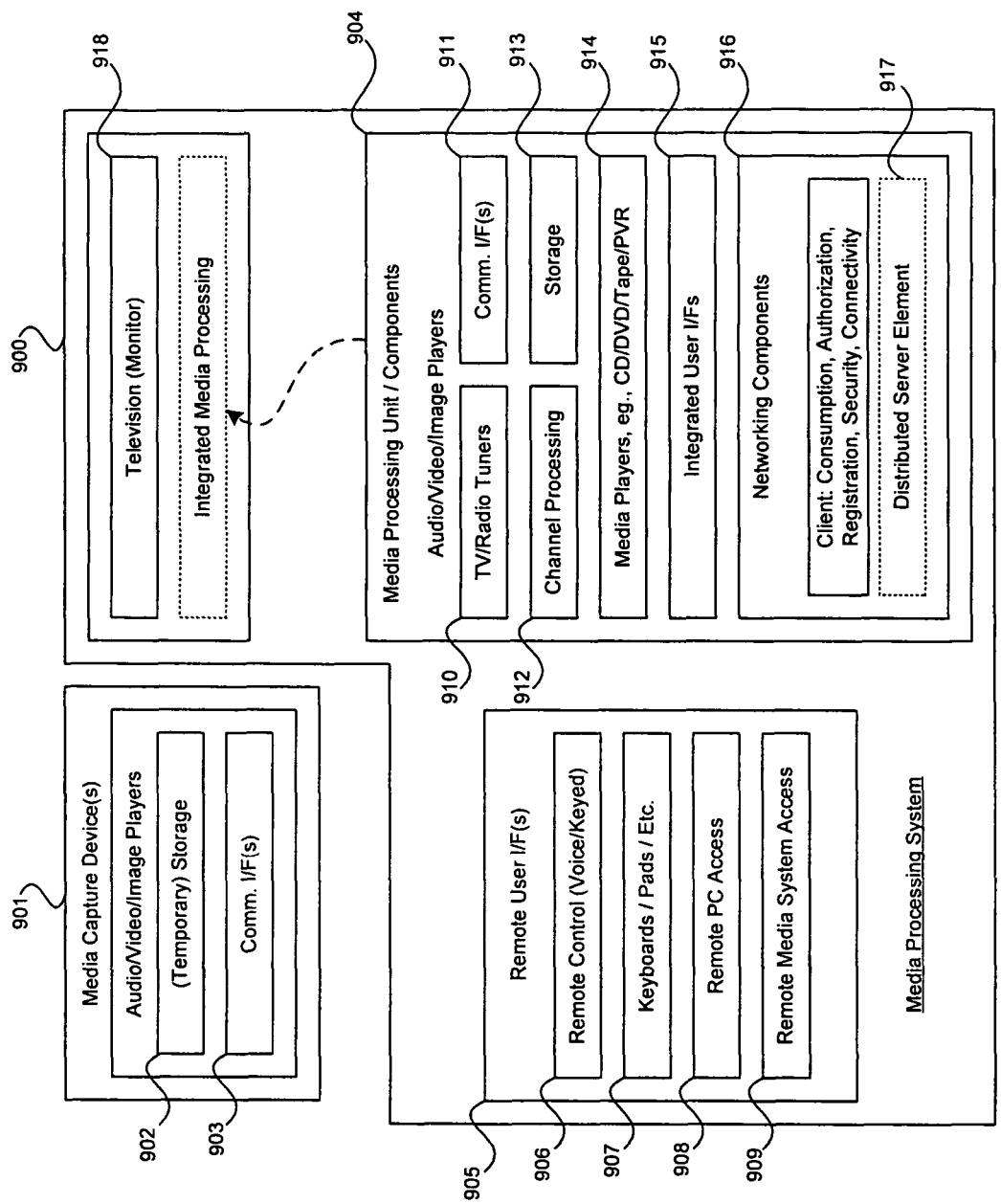
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
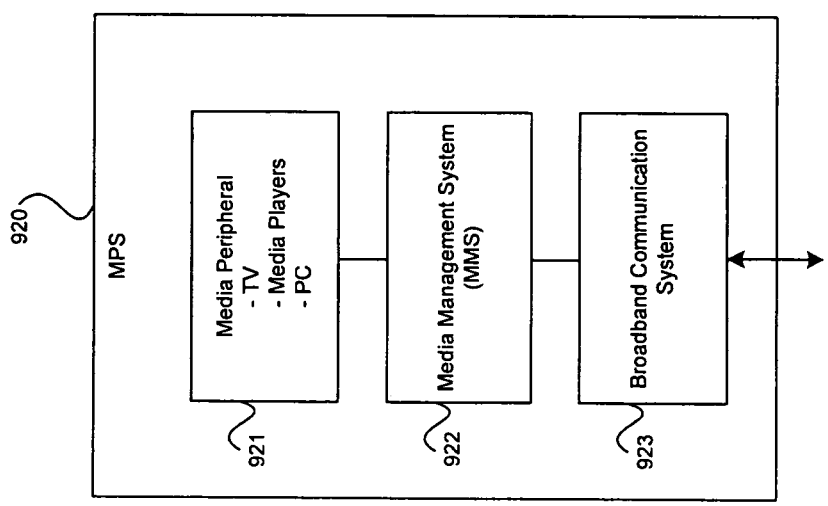
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
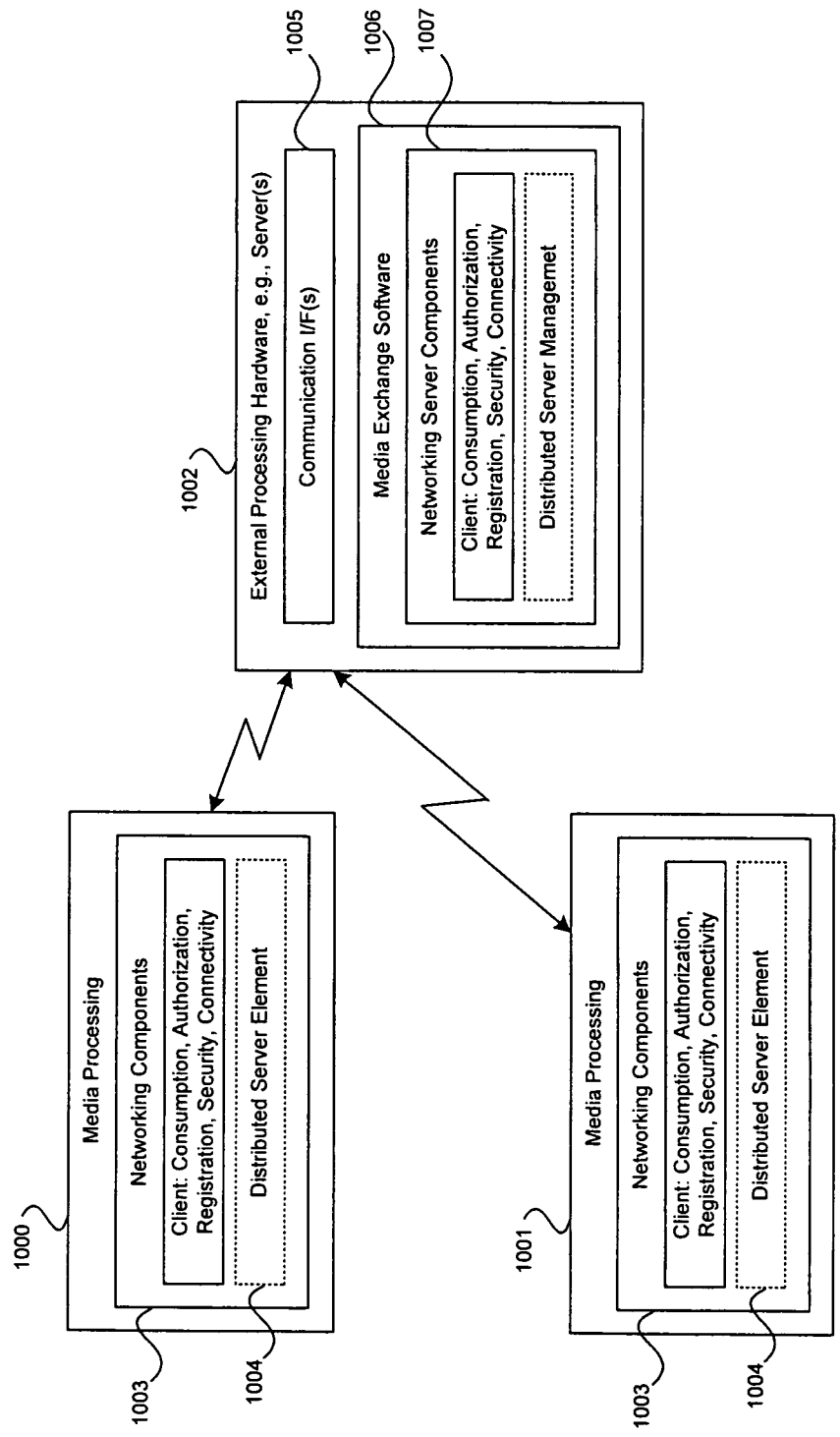
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
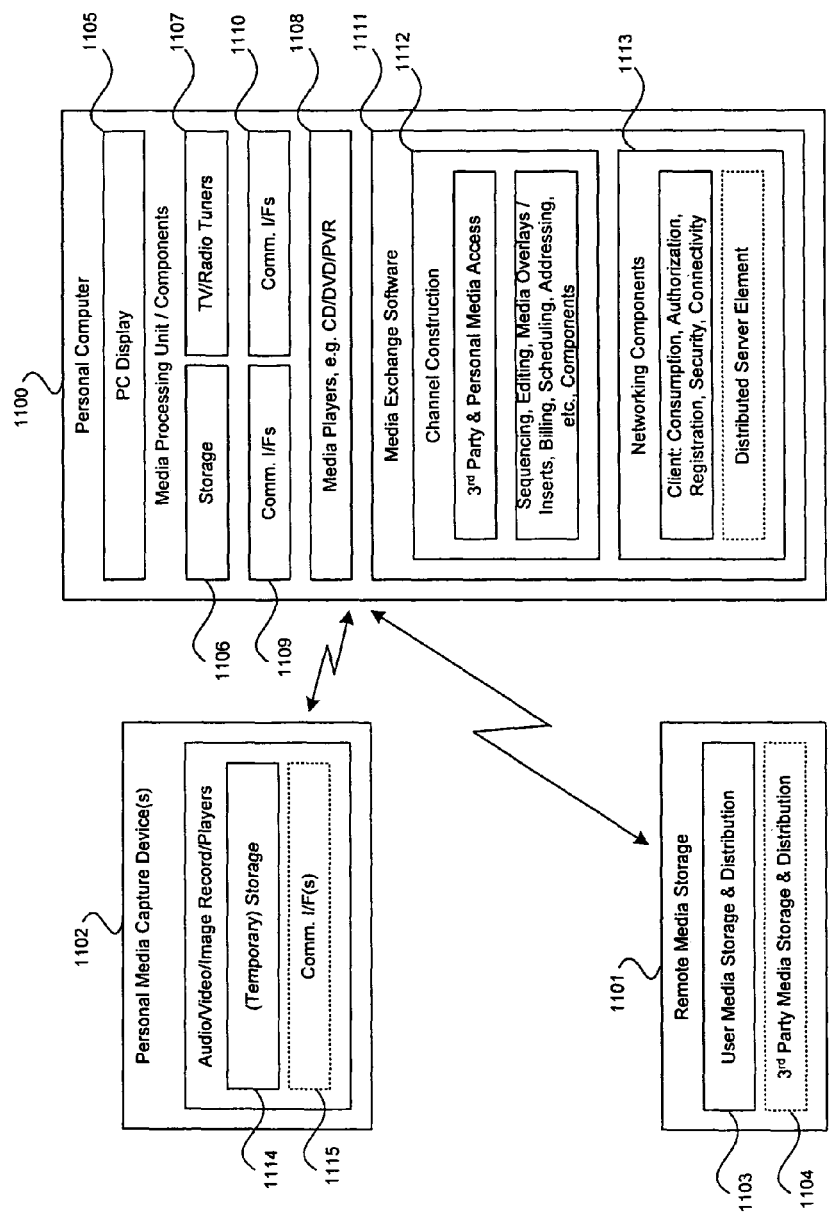
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Another embodiment of the invention may include a system for providing media in a communication network and may comprise at least one processor that may be adapted to generate a request from a first location to receive media from a non-broadcast channel provider. The processor may be a media processing system processor, a media management system processor, a computer processor, a media exchange software processor and a media peripheral processor. The processor may also be configured to provide payment and/or authorization information to the non-broadcast channel provider and may receive the media from a storage location other than non-broadcast channel provider. Upon receiving the media, the processor may cause a representation of the received media to be presented in a media guide and/or a channel guide at the first location and the received media may be consumed at the first location.

The processor may also be configured to request that the received media be transferred from the storage location to a second location. In this regard, an identifier of the second location may be transferred by the processor to the non-broadcast channel provider so that media may be transferred directly to the second location. A representation of the transferred media may be presented by the processor in a media guide and/or a channel guide at the second location and the media to be selected and consumed at the second location. The non-broadcast channel provider may be searched in order to identify information that may be related to the media based on the generated request. The non-broadcast channel provider may be adapted to authorize the storage location to transfer the media to the first location and/or the second location.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing media in a communication network, comprising:
   generating a request for media by a first media processing system, wherein the request includes media destination information identifying a second media processing system;
   transmitting the request to a web server by the first media processing system;
   receiving the media from the web server by the second media processing system identified by the media destination information;
   assigning a first channel in a media guide for the media by the second media processing system, wherein the media guide includes a listing of channels assigned to personal media content selected from a plurality of personal devices accessible by the second media processing system and a listing of channels for third party media accessible by the second media processing system; and
   displaying the media guide by the second media processing system on a display for selection of a channel by a user.

2. The method of claim 1, wherein the plurality of personal devices are operatively coupled to the second media processing system over a local area network.

3. The method of claim 1, further comprising:
   transmitting payment and authorization information for the media to the web server by the first media processing system.

4. The method of claim 1, further comprising:
   receiving a selection of third party media content by the second media processing system from the first media processing system, wherein the third party media content is stored on a third party media provider device operatively coupled to the second media processing system over a wide area network;
   scheduling one or more channels for the selected third party media content by the second media processing system; and
   updating the media guide by the second media processing system with the one or more channels for the selected third party media content.

5. The method of claim 1, further comprising:
   receiving one or more channels for third party personal media content, wherein the third party personal media content is transmitted to the second media processing system by the first media processing system over a private media exchange network; and
   updating the media guide by the first media processing system with the one or more channels for the third party personal media content.

6. The method of claim 1, further comprising:
   generating the listing of channels assigned to personal media content selected from a plurality of personal devices accessible by the second media processing system by generating a personal media view of data content, audio content, video content and multimedia content stored on a plurality of personal devices operatively coupled to the second media processing system over a local area network.

7. The method of claim 6, further comprising:
receiving by the second media processing system a selection of one of the channels assigned to personal media content in the media guide, wherein the personal media content is stored on a first personal device of the plurality of personal devices;
requesting by the second media processing system the personal media content from the first personal device over the local area network;
receiving by the second media processing system the personal media content from the first personal device over the local area network; and
transmitting the personal media content to a display operatively coupled to the second media processing system.

8. The method of claim 1, wherein the second media processing device includes a set-top box and the display includes a television screen.

9. The method of claim 1, wherein the second media processing device includes a personal computing device and the display includes a personal computing device display.

10. A method for providing media in a communication network, the method comprising:
receiving a first request for media by a media exchange server from a first media processing system, wherein the first request includes media destination information identifying a second media processing system;
transmitting a second request for the media by the media exchange server to a web server hosting the media, wherein the second request includes media destination information identifying the media exchange server;
receiving the media by the media exchange server from the web server hosting the media; and
transmitting the media by the media exchange server to the second media processing system identified by the media destination information in the first request.

11. The method of claim 10, further comprising:
receiving the media from the media exchange server by the second media processing system identified by the media destination information in the first request;
assigning a first channel in a media guide for the media by the second media processing system, wherein the media guide includes a listing of channels assigned to personal media content stored on a plurality of personal devices and third party media accessible by the second media processing system; and
displaying the media guide by the second media processing system on a display for selection of a channel by a user.

12. The method of claim 11, wherein the plurality of personal devices are operatively coupled to the second media processing system over a local area network.

13. The method of claim 12, further comprising:
receiving a selection of third party media content by the second media processing system from the first media processing system, wherein the third party media content is stored on a third party media provider device operatively coupled to the second media processing system over a wide area network;
scheduling one or more channels for the selected third party media content by the second media processing system; and updating the media guide by the second media processing system with the one or more channels for the selected third party media content.

14. The method of claim 13, further comprising:
receiving one or more channels for third party personal media content, wherein the third party personal media content is transmitted to the second media processing system by the first media processing system over a private media exchange network; and
updating the media guide by the first media processing system with the one or more channels for the third party personal media content.

15. The method of claim 10, further comprising:
transmitting payment and authorization information for the media to the web server by the media exchange server.

16. The method of claim 10, further comprising:
storing the media from the web server hosting the media by the media exchange server in a media storage server; and
transmitting the media by the media exchange server to the second media processing system from the media storage server.

17. The method of claim 10, wherein the second media processing system includes a set-top box.

18. The method of claim 10, wherein the second media processing system includes a personal computing device.

19. A system for providing media in a communication network, the system comprising:
a media exchange server operable to:
receive a first request for media by a media exchange server from a first media processing system, wherein the first request includes media destination information identifying a second media processing system;
transmit a second request for the media by the media exchange server to a web server hosting the media, wherein the second request includes media destination information identifying the media exchange server;
receive the media by the media exchange server from the web server hosting the media; and
transmit the media by the media exchange server to the second media processing system identified by the media destination information in the first request.

20. The system of claim 19, further comprising:
a second media processing system operable to:
receive the media from the media exchange server by the second media processing system identified by the media destination information in the first request;
assign a first channel in a media guide for the media by the second media processing system, wherein the media guide includes a listing of channels assigned to personal media content stored on a plurality of personal devices and third party media accessible by the second media processing system; and
display the media guide by the second media processing system on a display for selection of a channel by a user.

21. The system of claim 20, wherein the plurality of personal devices are operatively coupled to the second media processing system over a local area network.

22. The system of claim 21, wherein the second media processing system is further operable to:
receive a selection of third party media content by the second media processing system from the first media processing system, wherein the third party media content is stored on a third party media provider device operatively coupled to the second media processing system over a wide area network;

schedule one or more channels for the selected third party media content by the second media processing system; and update the media guide by the second media processing system with the one or more channels for the selected third party media content.

23. The system of claim 21, wherein the second media processing system is further operable to:

receive one or more channels for third party personal media content, wherein the third party personal media content is transmitted to the second media processing system by the first media processing system over a private media exchange network; and update the media guide by the first media processing system with the one or more channels for the third party personal media content.

24. The system of claim 19, wherein the media exchange server is further operable to:

store the media from the web server hosting the media by the media exchange server in a media storage server; and transmit the media by the media exchange server to the second media processing system from the media storage server.

25. The system of claim 19, wherein the second media processing system includes a set-top box.

26. The system of claim 19, wherein the second media processing system includes a personal computing device.

* * * * *